United States Patent
Van Lieshout et al.

(10) Patent No.: US 10,004,011 B2
(45) Date of Patent: Jun. 19, 2018

(54) MOBILITY STATE ENHANCEMENTS

(75) Inventors: Gert-Jan Van Lieshout, Middlesex (GB); Himke Van Der Velde, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 688 days.

(21) Appl. No.: 14/240,633

(22) PCT Filed: Aug. 21, 2012

(86) PCT No.: PCT/KR2012/006620
§ 371 (c)(1),
(2), (4) Date: Apr. 8, 2014

(87) PCT Pub. No.: WO2013/027993
PCT Pub. Date: Feb. 28, 2013

(65) Prior Publication Data
US 2014/0248885 A1    Sep. 4, 2014

(30) Foreign Application Priority Data

Aug. 22, 2011   (GB) .................................. 1114461.5

(51) Int. Cl.
*H04W 36/00* (2009.01)
*H04W 36/32* (2009.01)
*H04W 36/04* (2009.01)
*H04W 84/04* (2009.01)

(52) U.S. Cl.
CPC ... *H04W 36/0088* (2013.01); *H04W 36/0094* (2013.01); *H04W 36/32* (2013.01); *H04W 36/04* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2006/0211379 A1* | 9/2006 | Mantha | H01Q 3/00 455/73 |
| 2006/0251105 A1 | 11/2006 | Kim et al. | |
| 2007/0191013 A1 | 8/2007 | Gunnarsson et al. | |
| 2009/0010224 A1 | 1/2009 | Attar et al. | |

(Continued)

FOREIGN PATENT DOCUMENTS

| | | |
|---|---|---|
| CN | 101116277 A | 1/2008 |
| CN | 101453770 A | 6/2009 |

(Continued)

*Primary Examiner* — Suhail Khan
(74) *Attorney, Agent, or Firm* — Jefferson IP Law, LLP

(57) ABSTRACT

In a cellular communications network, a measurement report is requested to enable handover conditions to be established. In one approach, a measurement report is based on satisfaction of an event. Signalling for this measurement report includes one or more parameters on the basis of which the event is defined, including a trigger time defining a time period over which the event should be satisfied for the report to be triggered. In one approach, speed dependent scaling is applied to a parameter other than the trigger time, in the defined event. In another approach, a handover scenario, concerning the nature of the cell in which the user equipment is operational, and optionally that of a neighboring cell, governs the definition of a trigger event.

14 Claims, 7 Drawing Sheets

(56) References Cited

U.S. PATENT DOCUMENTS

| | | |
|---|---|---|
| 2009/0143093 A1 | 6/2009 | Somasundaram et al. |
| 2010/0003981 A1 | 1/2010 | Ahluwalia |
| 2010/0142486 A1 | 6/2010 | Wahlqvist et al. |
| 2010/0234014 A1 | 9/2010 | Virkki et al. |
| 2010/0267378 A1 | 10/2010 | Hamabe et al. |
| 2010/0298001 A1 | 11/2010 | Dimou et al. |
| 2011/0263262 A1 | 10/2011 | Min et al. |
| 2012/0108252 A1 | 5/2012 | Dimou et al. |
| 2012/0176910 A1 | 7/2012 | Cui |
| 2012/0202482 A1 | 8/2012 | Katepalli et al. |
| 2012/0202497 A1 | 8/2012 | Yan et al. |
| 2013/0005344 A1 | 1/2013 | Dimou et al. |
| 2013/0023302 A1* | 1/2013 | Sivanesan ............ H04W 36/32 455/525 |
| 2013/0040692 A1* | 2/2013 | Chen .................... H04W 36/04 455/525 |
| 2013/0273919 A1* | 10/2013 | Sashihara ......... H04W 36/0083 455/436 |
| 2014/0248885 A1 | 9/2014 | Van Lieshout et al. |
| 2014/0315537 A1 | 10/2014 | Van Lieshout et al. |
| 2014/0362803 A1 | 12/2014 | Chun et al. |
| 2015/0009801 A1 | 1/2015 | Velde et al. |

FOREIGN PATENT DOCUMENTS

| | | |
|---|---|---|
| CN | 101637045 A | 1/2010 |
| CN | 101669381 A | 3/2010 |
| CN | 101895912 A | 11/2010 |
| CN | 101964994 A | 2/2011 |
| CN | 102025471 A | 4/2011 |
| CN | 102026394 A | 4/2011 |
| EP | 1954090 A1 | 8/2008 |
| EP | 2 606 676 A1 | 6/2013 |
| EP | 2 749 078 | 7/2014 |
| EP | 2749066 A2 | 7/2014 |
| GB | 2498781 A | 7/2013 |
| KR | 10-2008-0012925 A | 2/2008 |
| KR | 10-2008-0061487 A | 7/2008 |
| KR | 10-2011-0086629 A | 7/2011 |
| WO | 00/70897 A1 | 11/2000 |
| WO | 2005/096657 A1 | 10/2005 |
| WO | 2008/099719 A1 | 8/2008 |
| WO | 2009/058069 A1 | 5/2009 |
| WO | 2010/104446 A1 | 9/2010 |
| WO | 2010/105416 A1 | 9/2010 |
| WO | 2010/151016 A2 | 12/2010 |
| WO | 2010/151198 A1 | 12/2010 |
| WO | 2010/151846 A1 | 12/2010 |
| WO | 2011/018616 A2 | 2/2011 |
| WO | 2011/041753 A2 | 4/2011 |
| WO | 2011/123006 A1 | 10/2011 |
| WO | 2011/136565 A2 | 11/2011 |
| WO | 2013/027993 A2 | 2/2013 |
| WO | 2013/028002 A2 | 2/2013 |

* cited by examiner

[Fig. 1]
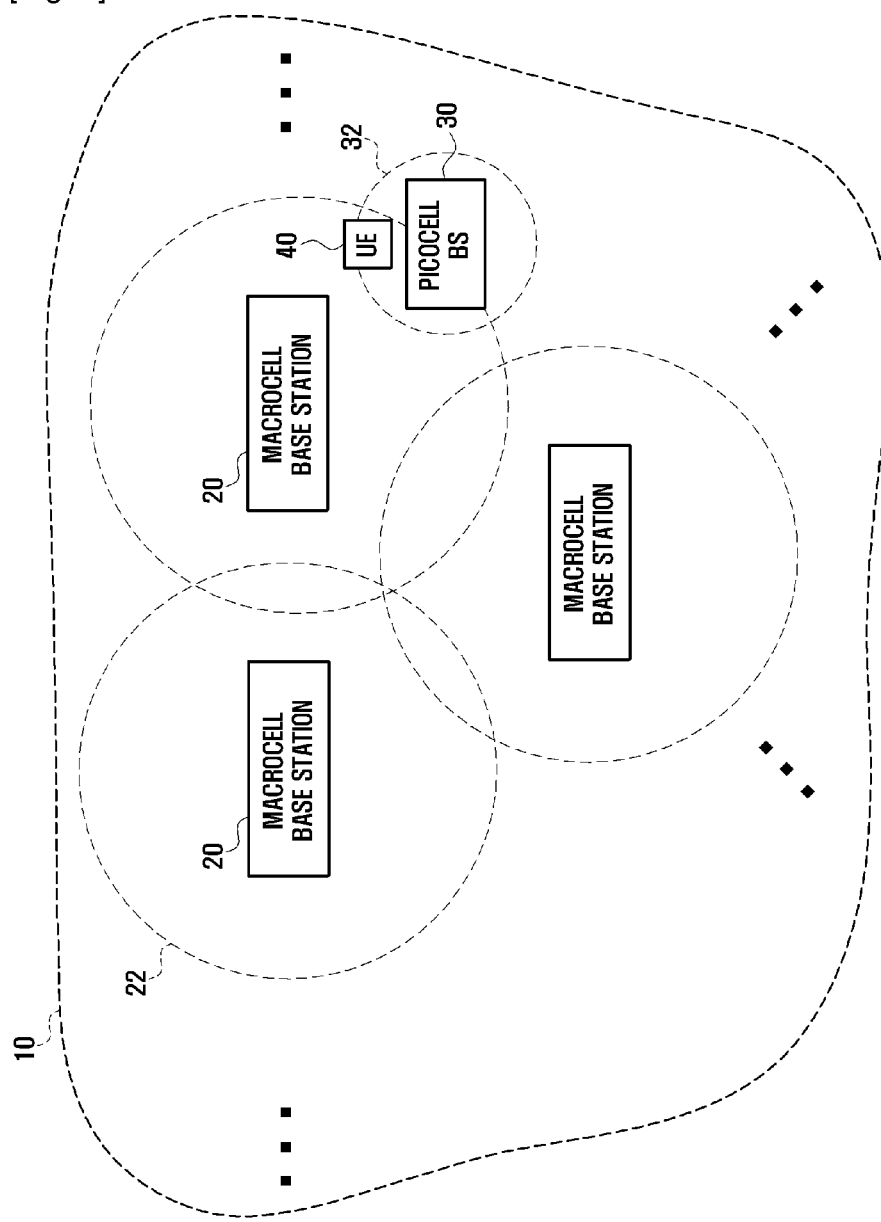

[Fig. 2]
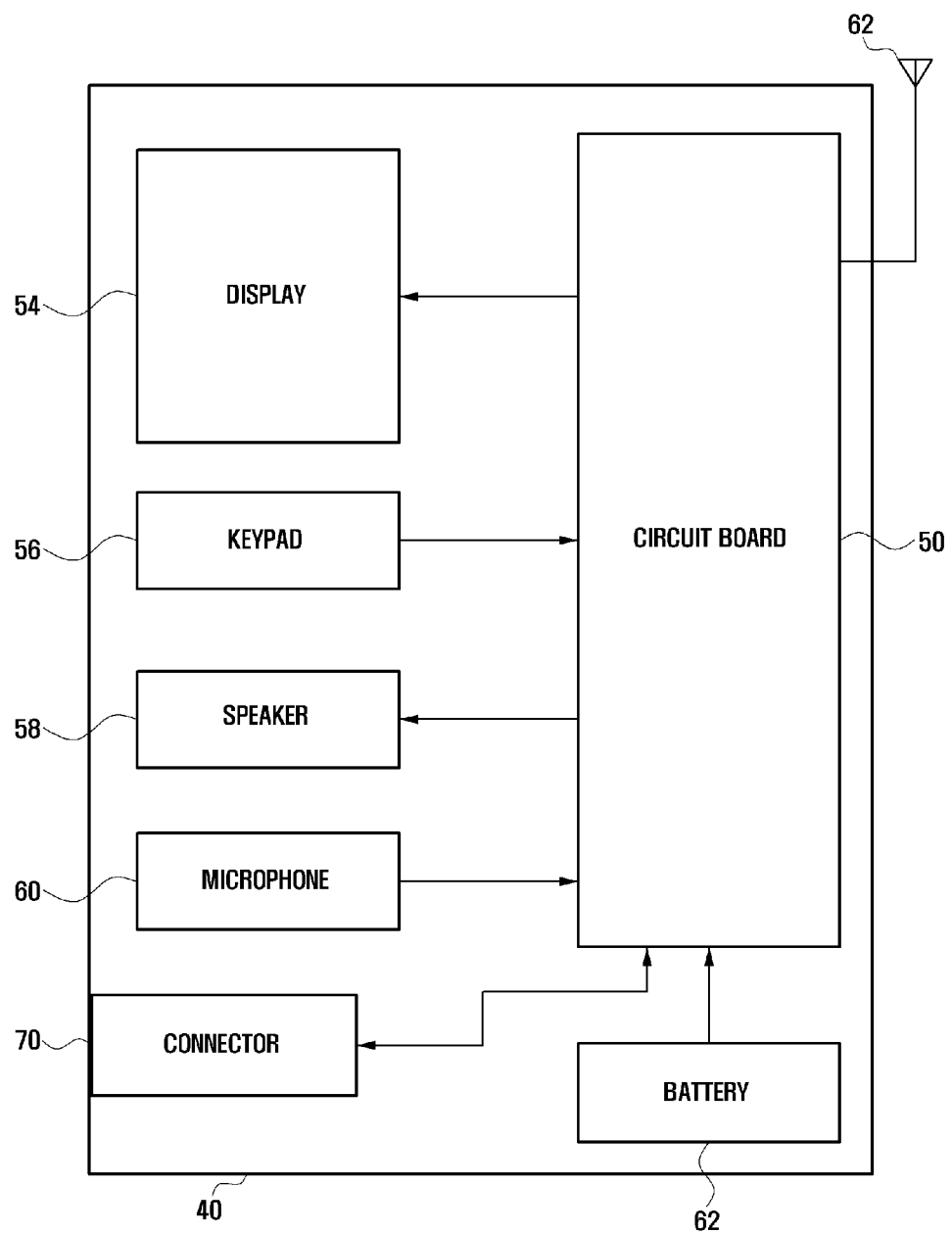

[Fig. 3]
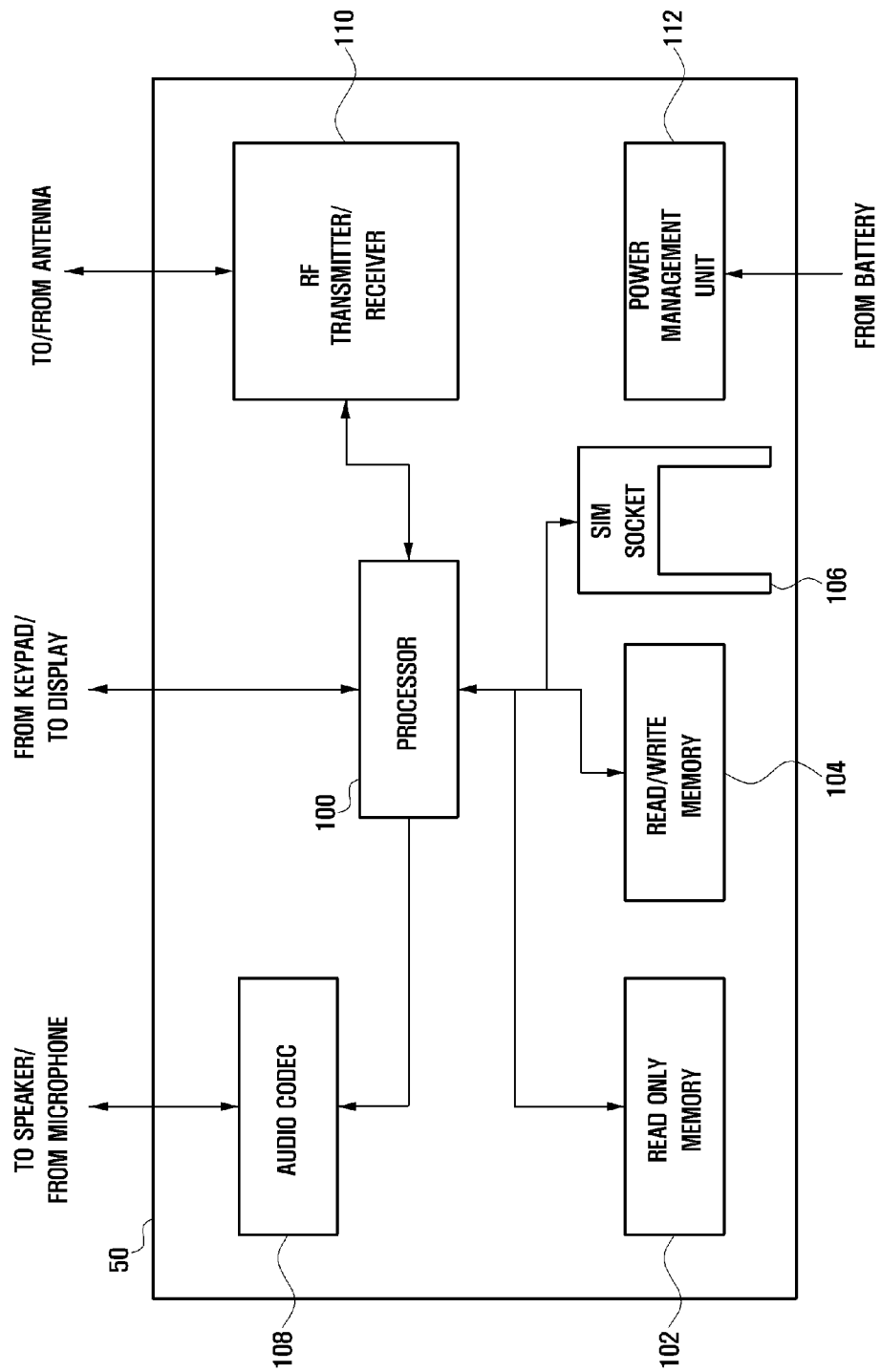

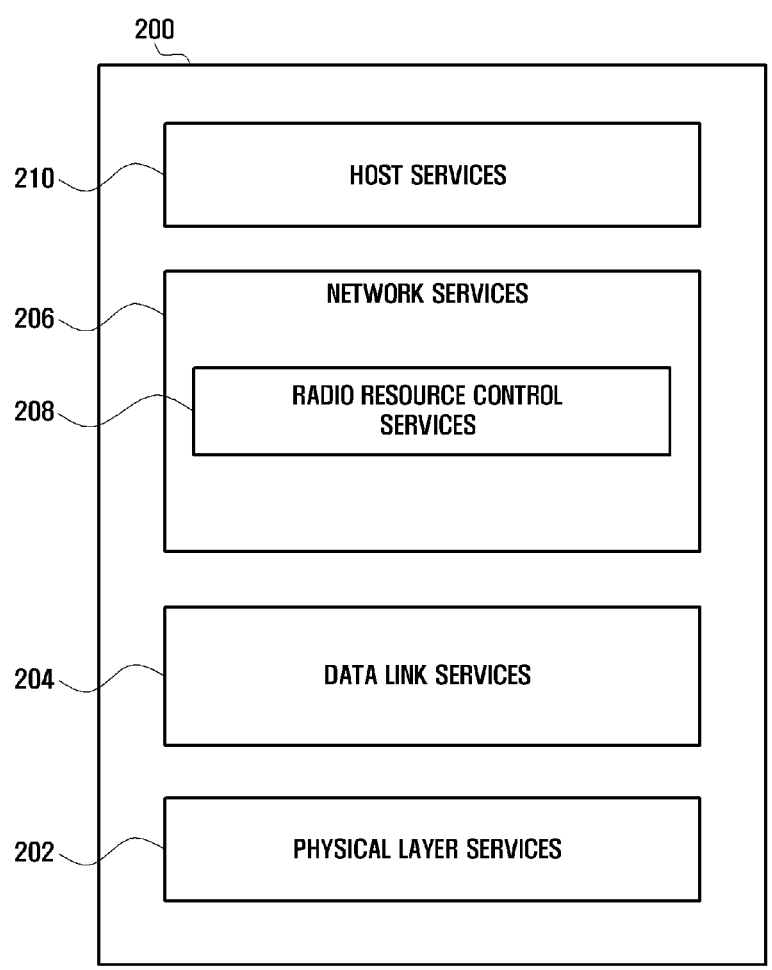
[Fig. 4]

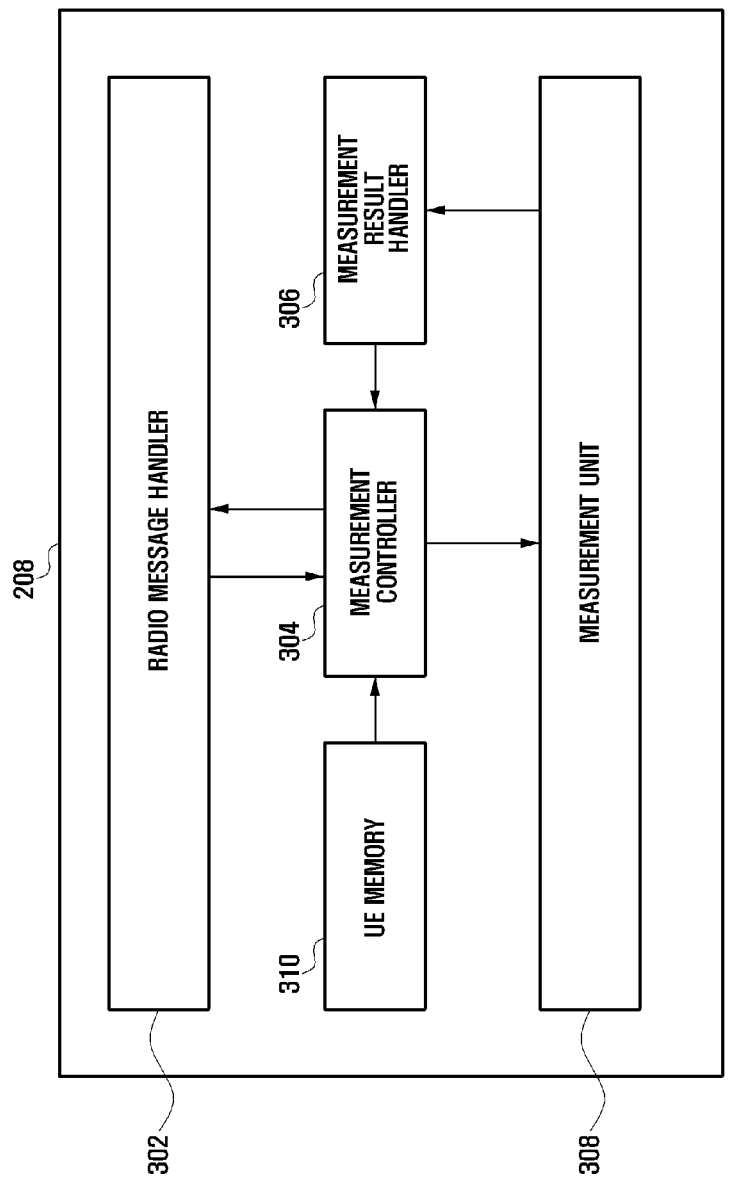
[Fig. 5]

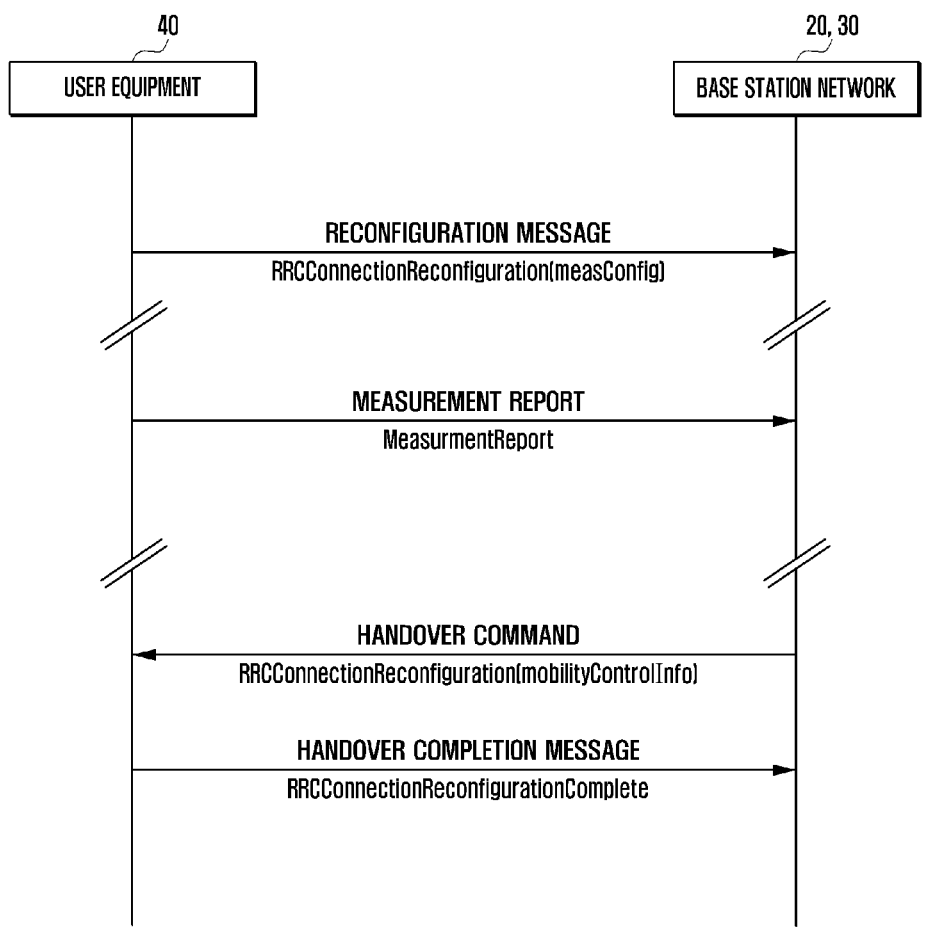
[Fig. 6]

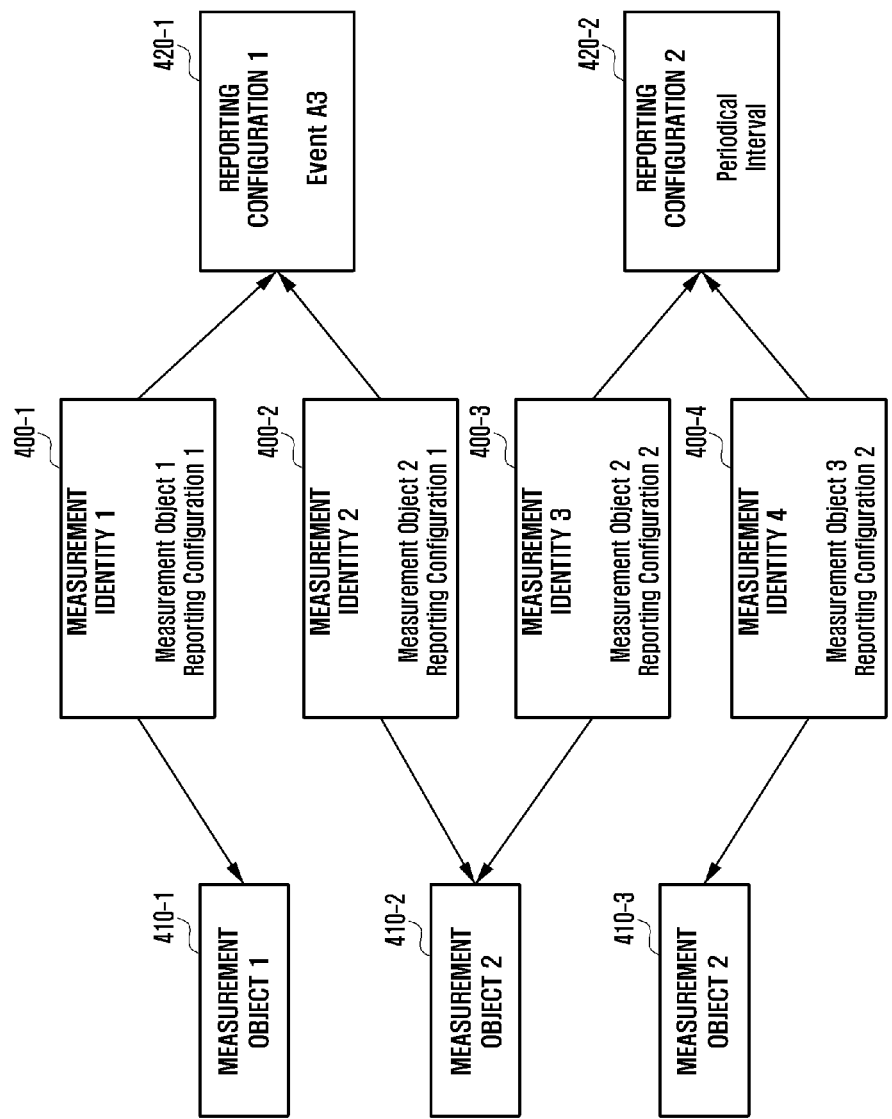
[Fig. 7]

MOBILITY STATE ENHANCEMENTS

TECHNICAL FIELD

Embodiments described herein relate generally to wireless communication. The present disclosure relates more particularly, but not exclusively, to cellular wireless communication in an environment where performance capabilities of communications cells are heterogeneous.

BACKGROUND ART

Numerous technical solutions exist for the implementation of wireless communications networks. Many of these involve maintenance of a wireless communications medium for use by user equipment (UE) by deployment of base stations (BS) establishing cells.

Cells can be defined in numerous ways, in any particular communication technology. Indeed, many communications standards offer a number of different types of cell, which can be defined in particular locations to take account of technical need. For instance, terms such as "macrocell", "microcell", "picocell", and "femtocell" have become known in the field, to describe communications facilities established to provide radio service coverage for a UE over particular ranges. Such terms are inevitably inexact, as no guarantee can be given as to the particular range of a base station establishing a macrocell, microcell or picocell, without reference to the location or environment in which the base station is to be placed. Indeed, the terms have been used in different contexts by different service providers and manufacturers.

Moreover, the question as to what constitutes a macrocell, for instance, is not easily determined in purely technical performance terms, as environmental circumstances will affect the capabilities of a particular macrocell BS. For instance, rugged terrain will inhibit or attenuate signals emitted by a macrocell base station, or transmitted thereto. Similar limitations may prevail in installation of a BS for implementation of a microcell or picocell.

It will be noted by the reader particularly that the term "picocell" has been widely adopted as shorthand for BS equipment establishing a relatively short range communication cell implied by the term, rather than, or as well as, the cell itself. This could result in confusion in any discussion, leading to a failure to distinguish between references to the cell or to the BS itself. For reasons of consistency, the term "picocell" is used throughout this disclosure to mean the cellular communication range established by a picocell BS. It will be appreciated by the reader that a BS could be used to establish more than one cell, for example a macrocell and a picocell, and so the illustrated examples herein do not imply that the disclosure only relates to cases where a BS is dedicated to the establishment of a particular type of cell

DISCLOSURE OF INVENTION

Technical Problem

It has been established that the technology required to support communication in a macrocell may be different from that required to support communication in, say, a picocell. Transition of a UE from an established communication channel with a first BS, to establishing communication with another BS, is known as handover. Handover from one macrocell BS to another is widely understood, and has been a characteristic of cellular wireless telephony networks since their inception. By contrast, handover from a macrocell BS to a picocell BS remains in development.

Solution to Problem

In general terms, certain embodiments described herein set forth mechanisms for managing handover of a wireless communications device from one cell to another, in a cellular wireless communications network.

In further general terms, a cellular communications network can be provided, in which a measurement report is requested to enable handover conditions to be established. In one approach, a measurement report is based on satisfaction of an event. Signalling for this measurement report includes one or more parameters on the basis of which the event is defined, including a trigger time defining a time period over which the event should be satisfied for the report to be triggered. In one approach, speed dependent scaling is applied to a parameter other than the trigger time, in the defined event. In another approach, a handover scenario, concerning the nature of the cell in which the user equipment is operational, and optionally that of a neighbouring cell, governs the definition of a trigger event. In another approach, a gradient of a measurement is used to govern the definition of a trigger event. All of these approaches can be combined.

One embodiment provides a wireless communications apparatus configured to operate in a cellular communications network, the apparatus comprising a measurement unit operable to perform a measurement on performance of said apparatus in said cellular network, trigger event defining means operable to define a trigger event on the basis of at least one measurement and at least two parameters, a measurement controller operable to determine, on the basis of said measurement, if said trigger event has been satisfied and, in the event that said trigger event has been satisfied, to emit a measurement report comprising performance information for a cell in which the apparatus is operational in use and a neighbouring cell, wherein the or at least two of said parameters are scalable dependent on a speed scaling configuration parameter indicative of speed of said apparatus.

The apparatus may be operable to receive said speed scaling configuration parameter.

The apparatus may comprise speed determining means, operable to determine said speed scaling configuration parameter.

The apparatus may be operable to receive an event specific configuration parameter, on the basis of which the trigger event defining means is operable to define a trigger event, wherein the event specific configuration parameter is scalable dependent on said speed scaling configuration parameter.

The apparatus may be operable to receive a cell specific parameter, defined for a cell in which the apparatus can be operational, on the basis of which the trigger event determining means is operable to determine said trigger event, the cell specific parameter being scalable dependent on said speed scaling configuration parameter.

The apparatus may be operable to receive a frequency specific parameter, defined for a frequency at which the apparatus can be operational, on the basis of which the trigger event determining means is operable to determine said trigger event, the frequency specific parameter being scalable dependent on said speed scaling configuration parameter.

The apparatus may be operable to receive a plurality of parameters, on the basis of which the trigger event determining means is operable to determine said trigger event, and, associated with each parameter, a set of parameter scaling factors corresponding to states of said speed scaling configuration parameter, the apparatus further comprising parameter scaling means operable to select, for each parameter, the parameter scaling factor corresponding to the state of said speed scaling configuration parameter and to scale each of said parameters with respect to said selected parameter scaling factor.

The apparatus may be operable to receive a message comprising said plurality of parameters and said parameter scaling factors.

Another embodiment provides wireless communications apparatus configured to operate in a cellular communications network, the apparatus comprising a measurement unit operable to perform a measurement on performance of said apparatus in said cellular network, trigger event defining means operable to define a trigger event in terms of at least one measurement and at least one configuration parameter, a measurement controller operable to determine, on the basis of said measurement, if a trigger event has been satisfied and, in the event that said trigger event has been satisfied, to emit a measurement report comprising performance information for a cell in which the apparatus is operational in use and a neighbouring cell, and handover scenario determining means operable to determine, on the basis of a characteristic of at least one of the cells, a handover scenario parameter defining a tendency to handover from the operational cell to said neighbouring cell, wherein the trigger event is defined at least by said handover scenario parameter and by said configuration parameter.

The apparatus may comprise configuration parameter set selection means, operable on the basis of the handover scenario parameter, to select a set of configuration parameters from a plurality of sets of configuration parameters, and wherein said trigger event defining means is operable to define said trigger event on the basis of the selected set of configuration parameters.

The apparatus may be operable to receive cell characteristic information, on the basis of which the handover scenario determining means can determine, for a cell, or for a cell to cell transition, said handover scenario parameter.

The cell characteristic information may comprise cell set information defining a set of cells associated with a first handover characteristic, the handover scenario determining means being operable to determine, for a cell, whether that cell is identified in the set of cells and therefore has said first handover characteristic or whether it has a second handover characteristic.

The apparatus may be operable to receive a message containing the cell characteristic information and the parameter information from a remote device.

The handover scenario determining means may be operable to determine, for a given cell-to-cell transition, a handover scenario parameter based on respective mobility characteristics of the cells of the transition.

The trigger event defining means may comprise parameter scaling means, operable to scale at least one of the selected configuration parameters on the basis of the handover scenario parameter and on the basis of a speed scaling configuration parameter indicative of speed of the apparatus.

The trigger event defining means may be operable to apply a scaling factor to at least one of the parameters in the selected set of parameters, the scaling factor corresponding to said speed scaling configuration parameter.

The handover scenario parameter may be in one of four different states.

The handover scenario parameter may be in one of two different states.

The trigger event defining means may be operable to apply a scaling factor to at least one of the parameters defining the trigger event, the scaling factor being determined on the basis of a speed state of the apparatus, the scaling factor being further determined on the basis of the handover scenario parameter.

The handover scenario parameter may have a state which can be one of a plurality of states, one of the states being indicative of a relatively high mobility state, the trigger event defining means being operable to apply a scaling factor corresponding to that relatively high mobility state if said handover scenario parameter is in the state indicative of the relatively high mobility state.

The handover scenario parameter may have a state which can be one of a plurality of states, and wherein a minimum scaling factor is provided for each of the plurality of states of the handover scenario parameter, the trigger event defining means being operable to apply a scaling factor which is greater than or equal to the minimum scaling factor, regardless of the state of the speed state of the apparatus.

The apparatus may be operable to receive cell characteristic information, on the basis of which the handover scenario determining means can determine, for a cell, or for a cell to cell transition, said handover scenario parameter.

The cell characteristic information may comprise cell set information defining a set of cells associated with a first handover characteristic, the handover scenario determining means being operable to determine, for a cell, whether that cell is identified in the set of cells and therefore has said first handover characteristic or whether it has a second handover characteristic.

The apparatus may be operable to receive a message containing the cell set information and the parameter information from a remote device.

The handover scenario determining means may be operable to determine, for a given cell-to-cell transition, a handover scenario parameter based on respective mobility characteristics of the cells of the transition.

The trigger event defining means may be operable to apply a scaling factor to at least one of the parameters on the basis of which it defines the trigger event, the scaling factor being dependent on the handover scenario parameter.

The apparatus may be operable to receive cell characteristic information, on the basis of which the handover scenario determining means can determine, for a cell, or for a cell to cell transition, said handover scenario parameter.

The cell characteristic information may comprise cell set information defining a set of cells associated with a first handover characteristic, the handover scenario determining means being operable to determine, for a cell, whether that cell is identified in the set of cells and therefore has said first handover characteristic or whether it has a second handover characteristic.

The apparatus may be operable to receive a message containing the cell characteristic information and the parameter information from a remote device.

The handover scenario determining means may be operable to determine, for a given cell-to-cell transition, a handover scenario parameter based on respective mobility characteristics of the cells of the transition.

The handover scenario parameter may be in one of four different states.

The handover scenario parameter may be in one of two different states.

The apparatus may be operable to receive a message containing scaling factor information defining scaling factors to be selectively applied, and the parameter information, from a remote device.

Another embodiment provides a wireless communications apparatus configured to operate in a cellular communications network, the apparatus comprising a measurement unit operable to perform a measurement on performance of said apparatus in said cellular network, trigger event defining means operable to define a trigger event in terms of at least one measurement and at least one parameter, and a measurement controller operable to determine, on the basis of said measurement, if a trigger event has been satisfied and, in the event that said trigger event has been satisfied, to emit a measurement report comprising performance information for a cell in which the apparatus is operational in use and a neighbouring cell, wherein the measurement unit is operable to determine a gradient of said measurement with respect to displacement of the apparatus, and wherein the trigger event determining means is operable to determine the trigger event on the basis of said gradient.

The apparatus may be operable to receive a plurality of parameter sets, the trigger event defining means being operable to select one of said parameter sets, on the basis of said determined gradient, said trigger event defining means being operable to define said trigger event on the basis of said selected parameter set.

The apparatus may be operable to determine a gradient level parameter, the gradient level parameter being capable of being in one of a plurality of discrete states, wherein each of said plurality of parameter sets corresponds to one of the available states of the gradient level parameter.

The trigger event defining means may comprise parameter scaling means, operable to scale at least one of the selected configuration parameters on the basis of the gradient level parameter and on the basis of a speed scaling configuration parameter indicative of speed of the apparatus.

The apparatus may be operable to receive a message containing the gradient level parameter and the parameter information from a remote device.

The trigger event defining means may be operable to apply a scaling factor to at least one of the parameters in the selected set of parameters, the scaling factor corresponding to said speed scaling configuration parameter.

The measurement unit may be operable to make measurements on the basis of two cells, and to determine a gradient on the basis of the two measurements.

The apparatus may further comprise a filter operable to filter measurement results, in order that a gradient result can be determined on the basis of filtered measurement results.

The trigger event defining means may be operable to define a trigger event incorporating the determined gradient.

The trigger event defining means may be operable to modify a parameter used in the trigger event, with respect to an algebraic relationship using the gradient.

The trigger event defining means may be operable to modify a parameter used in the trigger event, by adding, to the parameter, a product of the gradient and a multiplication factor.

The apparatus may be operable to receive said multiplication factor from a remote location.

The apparatus may be operable to receive a message comprising said parameters and said multiplication factor.

The apparatus may be operable to determine, on the basis of a determined gradient, a gradient level parameter for the cell on the basis of which the gradient has been determined, to select a speed scaling factor for a parameter on the basis of which the trigger event defining means determines the trigger event, the speed scaling factor being determined on the basis of the gradient level parameter and a speed state of the apparatus, and wherein the trigger event defining means is operable to apply the scaling factor to the parameter when defining the trigger event.

In one arrangement of the embodiment, the gradient level parameter can be one of a plurality of discrete, ranked states, and the speed state can be one of a plurality of discrete, ranked states, the speed scaling factor being determined on the basis of the higher of the gradient level parameter and the speed state.

In one arrangement of the embodiment, the gradient level parameter can be one of a plurality of discrete states, and wherein, for each state of the gradient level parameter, a minimum scaling factor is assigned, such that the scaling factor applied by the trigger event defining means is at least the minimum scaling factor determined by the state of the gradient level parameter.

The measurement unit may be operable to make measurements on the basis of two cells, and to determine a gradient on the basis of the two measurements.

The apparatus may further comprise a filter operable to filter measurement results, in order that a gradient result can be determined on the basis of filtered measurement results.

The apparatus may be operable to receive a message containing the gradient level parameter and the parameter information from a remote device.

The trigger event determining means may be operable to determine the trigger event on the basis of a parameter, the trigger event determining means being operable to apply a gradient dependent scaling factor to the parameter.

The measurement unit may be operable to make measurements on the basis of two cells, and to determine a gradient on the basis of the two measurements.

The apparatus may further comprise a filter operable to filter measurement results, in order that a gradient result can be determined on the basis of filtered measurement results.

The apparatus may be operable to receive a message containing the gradient level parameter and the parameter information from a remote device.

The measurement controller may be operable, in use, to emit a measurement report comprising measurement gradient information for a reported measurement.

The apparatus may be operable to receive a configuration message which, when received by the apparatus, causes the apparatus to become configured to cause a measurement report, when emitted, to comprise measurement gradient information.

The measurement unit may be operable to make measurements on the basis of two cells, and to determine a gradient on the basis of the two measurements.

The apparatus may further comprise a filter operable to filter measurement results, in order that a gradient result can be determined on the basis of filtered measurement results.

The apparatus may be operable to receive a message containing the gradient level parameter and the parameter information from a remote device.

Another embodiment provides a method of operating a wireless communications apparatus in a cellular communications network, comprising performing measurements on performance of said apparatus in said cellular network, defining a trigger event on the basis of at least one measurement and at least two parameters, including scaling the or at least two of said parameters with respect to a speed scaling configuration parameter indicative of speed of said apparatus, determining, on the basis of said measurement, if said trigger event has been satisfied and, if so, emitting a measurement report comprising performance information for a cell in which the apparatus is operational in use and a neighbouring cell.

The method may further comprise receiving said speed scaling configuration parameter.

The method may further comprise determining said speed scaling configuration parameter.

The method may further comprise receiving an event specific configuration parameter, on which the defining of the trigger event is based, and scaling the event specific configuration parameter dependent on said speed scaling configuration parameter.

The method may further comprise receiving a cell specific parameter, defined for a cell in which the apparatus is operational, on which the defining of the trigger event is based, and scaling the cell specific parameter dependent on said speed scaling configuration parameter.

The method may further comprise receiving a frequency specific parameter, defined for a frequency at which the apparatus is operational, defining said trigger event on the basis of the frequency specific parameter, including scaling the frequency specific parameter dependent on said speed scaling configuration parameter.

The method may further comprise receiving a plurality of parameters, defining said trigger event on the basis of the plurality of parameters, and, associating with each parameter, a set of parameter scaling factors corresponding to states of said speed scaling configuration parameter, further comprising selecting, for each parameter, the parameter scaling factor corresponding to the state of said speed scaling configuration parameter and scaling each of said parameters with respect to said selected parameter scaling factor.

The method may further comprise receiving a message comprising said plurality of parameters and said parameter scaling factors.

Another embodiment provides a method of operating a wireless communications apparatus in a cellular communications network, comprising performing measurements on performance of said apparatus in said cellular network, determining, on the basis of said measurements, if a trigger event has been satisfied and, if so, emitting a measurement report comprising performance information for a cell in which the apparatus is operational in use and a neighbouring cell, wherein said determining comprises determining a handover scenario parameter defining a tendency to handover from the operational cell to said neighbouring cell and defining said trigger event using said handover scenario parameter.

The method may further comprise selecting, on the basis of the handover scenario parameter, a set of configuration parameters from a plurality of sets of configuration parameters, and wherein said trigger event defining comprises defining said trigger event on the basis of the selected set of configuration parameters.

The method may further comprise receiving cell characteristic information, and determining, for a cell, or for a cell to cell transition, said handover scenario parameter.

The cell characteristic information may comprise cell set information defining a set of cells associated with a first handover characteristic, the handover scenario determining comprising determining, for a cell, whether that cell is identified in the set of cells and therefore has said first handover characteristic or whether it has a second handover characteristic.

The method may further comprise receiving a message containing the cell characteristic information and the parameter information from a remote device.

The handover scenario determining may comprise determining, for a given cell-to-cell transition, a handover scenario parameter based on respective mobility characteristics of the cells of the transition.

The defining of the trigger event may comprise scaling at least one of the selected configuration parameters on the basis of the handover scenario parameter and on the basis of a speed scaling configuration parameter indicative of speed of the apparatus.

The trigger event defining may comprise applying a scaling factor to at least one of the parameters in the selected set of parameters, the scaling factor corresponding to said speed scaling configuration parameter.

The handover scenario parameter can be in one of four different states.

The handover scenario parameter can be in one of two different states.

The trigger event defining may comprise determining a scaling factor on the basis of a speed state of the apparatus, and on the basis of the handover scenario parameter, and applying said scaling factor to at least one of the parameters defining the trigger event.

The handover scenario parameter may have a state which can be one of a plurality of states, one of the states being indicative of a relatively high mobility state, the trigger event defining comprising applying a scaling factor corresponding to that relatively high mobility state if said handover scenario parameter is in the state indicative of the relatively high mobility state.

The handover scenario parameter may have a state which can be one of a plurality of states, and wherein a minimum scaling factor is provided for each of the plurality of states of the handover scenario parameter, the trigger event defining comprising applying a scaling factor which is greater than or equal to the minimum scaling factor, regardless of the state of the speed state of the apparatus.

The method may further comprise receiving cell characteristic information, and determining, for a cell, or for a cell to cell transition, said handover scenario parameter on the basis of the received cell characteristic information.

The cell characteristic information may comprise cell set information defining a set of cells associated with a first handover characteristic, and determining, for a cell, whether that cell is identified in the set of cells and therefore has said first handover characteristic or whether it has a second handover characteristic.

The method may further comprise receiving a message containing the cell set information and the parameter information from a remote device.

The handover scenario determining may comprise determining, for a given cell-to-cell transition, a handover scenario parameter based on respective mobility characteristics of the cells of the transition.

The trigger event defining may comprise applying a scaling factor to at least one of the parameters on the basis of which it defines the trigger event, the scaling factor being dependent on the handover scenario parameter.

The method may further comprise receiving cell characteristic information, and determining, for a cell, or for a cell to cell transition, said handover scenario parameter on the basis of the received cell characteristic information.

The cell characteristic information may comprise cell set information defining a set of cells associated with a first handover characteristic, the handover scenario determining comprising determining, for a cell, whether that cell is identified in the set of cells and therefore has said first handover characteristic or whether it has a second handover characteristic.

The method may further comprise receiving a message containing the cell characteristic information and the parameter information from a remote device.

The handover scenario determining may comprise determining, for a given cell-to-cell transition, a handover scenario parameter based on respective mobility characteristics of the cells of the transition.

The handover scenario parameter can be in one of four different states.

The handover scenario parameter can be in one of two different states.

The method may further comprise receiving a message containing scaling factor information defining scaling factors to be selectively applied, and the parameter information, from a remote device.

Another embodiment provides a method of operating a wireless communications apparatus in a cellular communications network, comprising performing measurements on performance of said apparatus in said cellular network, including determining a gradient of at least one of said measurements with respect to displacement of the apparatus, defining a trigger event on the basis of said measurements and on the basis of said determined rate of change and, if said trigger event is satisfied, emitting a measurement report comprising performance information for a cell in which the apparatus is operational in use and a neighbouring cell.

The method may further comprise receiving a plurality of parameter sets, selecting one of said parameter sets, on the basis of said determined gradient, and defining said trigger event on the basis of said selected parameter set.

The method may further comprise determining a gradient level parameter, the gradient level parameter being capable of being in one of a plurality of discrete states, wherein each of said plurality of parameter sets corresponds to one of the available states of the gradient level parameter.

The method may further comprise scaling at least one of the selected configuration parameters on the basis of the gradient level parameter and on the basis of a speed scaling configuration parameter indicative of speed of the apparatus.

The method may further comprise receiving a message containing the gradient level parameter and the parameter information from a remote device.

The method may further comprise applying a scaling factor to at least one of the parameters in the selected set of parameters, the scaling factor corresponding to said speed scaling configuration parameter.

The method may further comprise making measurements on the basis of two cells, and determining a gradient on the basis of the two measurements.

The method may further comprise filtering measurement results, the determining of the gradient result being on the basis of filtered measurement results.

The trigger event defining may comprise defining a trigger event incorporating the determined gradient.

The trigger event defining may comprise modifying a parameter used in the trigger event, with respect to an algebraic relationship using the gradient.

The trigger event defining may comprise modifying a parameter used in the trigger event, by adding, to the parameter, a product of the gradient and a multiplication factor.

The method may further comprise receiving said multiplication factor from a remote location.

The method may further comprise receiving a message comprising said parameters and said multiplication factor.

The method may further comprise determining, on the basis of a determined gradient, a gradient level parameter for the cell on the basis of which the gradient has been determined, selecting a speed scaling factor for a parameter on the basis of which the trigger event defining is performed, the speed scaling factor determining being on the basis of the gradient level parameter and a speed state of the apparatus, and wherein the trigger event defining comprises applying the scaling factor to the parameter defining the trigger event.

The gradient level parameter can be one of a plurality of discrete, ranked states, and the speed state can be one of a plurality of discrete, ranked states, the speed scaling factor being determined on the basis of the higher of the gradient level parameter and the speed state.

The gradient level parameter can be one of a plurality of discrete states, and wherein, for each state of the gradient level parameter, a minimum scaling factor is assigned, such that the scaling factor applied in the trigger event defining is at least the minimum scaling factor determined by the state of the gradient level parameter.

The measuring may comprise making measurements on the basis of two cells, and determining a gradient on the basis of the two measurements.

The method may further comprise filtering measurement results, in order that said gradient determining is on the basis of filtered measurement results.

The method may further comprise receiving a message containing the gradient level parameter and the parameter information from a remote device.

The trigger event determining may be on the basis of a parameter, the trigger event determining comprising applying a gradient dependent scaling factor to the parameter.

The measuring may comprise making measurements on the basis of two cells, and determining a gradient on the basis of the two measurements.

The method may further comprise filtering measurement results, in order that said gradient determining is on the basis of filtered measurement results.

The method may further comprise receiving a message containing the gradient level parameter and the parameter information from a remote device.

The emitting of the measurement report may comprise emitting a measurement report comprising measurement gradient information for a reported measurement.

The emitting of a measurement report, when emitted comprising measurement gradient information may be in response to receipt of a configuration message.

The method may further comprise making measurements on the basis of two cells, and determining a gradient on the basis of the two measurements.

The method may further comprise filtering measurement results, said determining of said gradient being on the basis of filtered measurement results.

The method may further comprise receiving a message containing the gradient level parameter and the parameter information from a remote device.

Another embodiment provides a wireless communications apparatus operable to establish a cell of wireless communication coverage for use by user apparatus, the apparatus being operable in use with further apparatus to establish a cellular communications network, the apparatus being operable to emit a message to a user apparatus comprising trigger event information to enable establishment of a trigger event on the satisfaction of which the user apparatus will return a measurement report containing performance information, the trigger event information comprising at least two parameters, and scaling information, associated with the, or at least two of the parameters for scaling the parameters with respect to a speed scaling configuration parameter.

Another embodiment provides a cellular communications network, comprising a plurality of base stations, each defining a cell representing a useable region of wireless transmission and reception of said base station, each base station being operable to emit a message to a user apparatus with which it is in established communication, the message comprising trigger event information to enable establishment of a trigger event on the satisfaction of which the user apparatus will return a measurement report containing performance information, the trigger event information comprising at least two parameters, and scaling information, associated with the, or at least two of the parameters for scaling said parameters with respect to a speed scaling configuration parameter.

Another embodiment provides a wireless communications apparatus operable to establish a cell of wireless communication coverage for use by user apparatus, the apparatus being operable in use with further apparatus to establish a cellular communications network, the apparatus being operable to emit a message to a user apparatus comprising trigger event information to enable establishment of a trigger event on the satisfaction of which the user apparatus will return a measurement report containing performance information, the trigger event information comprising cell identification information for at least a subset of cells in said network, in use, identified as creating a particular tendency for handover within said network in comparison with other cells in said network.

Another embodiment provides a cellular communications network, comprising a plurality of base stations, each defining a cell representing a useable region of wireless transmission and reception of said base station, each base station being operable to emit a message to a user apparatus with which it is in established communication, the message comprising trigger event information to enable establishment of a trigger event on the satisfaction of which the user apparatus will return a measurement report containing performance information, the trigger event information comprising cell identification information for at least a subset of cells in said network, in use, identified as creating a particular tendency for handover within said network in comparison with other cells in said network.

Another embodiment provides a wireless communications apparatus operable to establish a cell of wireless communication coverage for use by user apparatus, the apparatus being operable in use with further apparatus to establish a cellular communications network, the apparatus being operable to emit a message to a user apparatus comprising trigger event information to enable establishment of a trigger event on the satisfaction of which the user apparatus will return a measurement report containing performance information, the trigger event information comprising parameter information on the basis of which the trigger event can be defined, and including a gradient parameter for including a rate of change of a measurement in said defined trigger event.

Another embodiment provides a cellular communications network, comprising a plurality of base stations, each defining a cell representing a useable region of wireless transmission and reception of said base station, each base station being operable to emit a message to a user apparatus with which it is in established communication, the message comprising trigger event information to enable establishment of a trigger event on the satisfaction of which the user apparatus will return a measurement report containing performance information, the trigger event information comprising parameter information on the basis of which the trigger event can be defined, and including a gradient parameter for including a rate of change of a measurement in said defined trigger event.

While the embodiments set out above are described as apparatus, methods and network, it will be appreciated by the reader that embodiments can also be implemented by way of a computer program products. In particular, a computer program product could be designed which allows configuration of a general purpose wireless communications apparatus as any one of the above embodiments relating to such a wireless communications apparatus, or to perform a method in accordance with any one of the above embodiments relating thereto. A computer program product could comprise computer executable instructions arranged to provide all of the software product means to put an embodiment into effect, or alternatively could comprise computer executable instructions which cooperate with other computer executable instructions which may already exist on a general purpose apparatus, such as an operating system, tools, and existing applications. The computer program product could also comprise configuration instructions to enable reconfiguration of existing computer executable instructions to cause a computer to perform in a different way.

A suitable computer program product could be embodied in the form of a storage medium, such as a computer readable storage disk, for example an optical disk. In the alternative, a computer program product could be in the form of a signal, delivered either by wireless means or through a hardwired connection to an apparatus. Nothing in this disclosure excludes the possibility of further means of delivery of the embodiments described herein by computer-related means hitherto not envisaged.

BRIEF DESCRIPTION OF DRAWINGS

FIG. 1 is a schematic diagram of a cellular wireless communications network in accordance with the described embodiments;

FIG. 2 is a schematic diagram of user equipment in the network illustrated in FIG. 1;

FIG. 3 is a schematic diagram of a circuit board of the user equipment illustrated in FIG. 2;

FIG. 4 is a schematic diagram of a protocol stack implemented on the circuit board illustrated in FIG. 3;

FIG. 5 is a schematic diagram of a radio resource controls services layer of the protocol stack illustrated in FIG. 4;

FIG. 6 is a schematic diagram of a handover procedure performed in the network illustrated in FIG. 1, involving the user equipment illustrated in FIG. 2; and FIG. 7 is a schematic diagram of a measConfig data structure used in the handover procedure illustrated in FIG. 6.

MODE FOR THE INVENTION

Embodiments will now be described with reference to the abovementioned drawings, to provide a more detailed appreciation of possible aspects, features and advantages of certain arrangements in line with the overall disclosure.

By way of background, one of the possible applications of the technology reflected in one or more of the described embodiments is the group of technologies known as Evolved Universal Terrestrial Radio Access (E-UTRA). In particular, Release 10 of the various specifications is a suitable recipient of one or more of the modifications and additional features set forth herein.

This may be with a view to extending the capacity and coverage of cellular networks, and in particular the deployment of Heterogeneous Networks (HetNet). HetNet involves a cellular deployment that consists of cells with different sizes and overlapping coverage, for example a number of micro and picocells overlaid with a macrocell.

However, as will be appreciated by the reader, application of embodiments or features as disclosed herein to other releases of the E-UTRA technology, or to other radio access systems, whether specified in generally agreed technical standards or not, is not precluded.

General Network Arrangement

For a better understanding of the field of application of one or more of the embodiments which will be described in due course, FIG. 1 illustrates a typical terrestrial wireless communications network 10 comprising a plurality of macrocell base stations (BS) 20. Each macrocell BS 20 is depicted with the maximum extent of its useful communications coverage delineated with a broken line 22.

Similarly, a picocell BS 30 is illustrated, again with the maximum extent of its useful communications coverage delineated with a broken line 32. User equipment (UE) 40 is shown positioned in a region where the range of a macrocell BS 20 and the picocell BS 30 overlap.

FIG. 2 illustrates the physical architecture of the UE 40 in further detail. As will be understood by the reader, the physical architecture is of a standard form, in line with the adaptability of such devices. As will be appreciated, configurations such devices is extremely flexible, and he's, in the main, achieved through the use of software. To that end, any of the embodiments described herein can be implemented by way of a computer program product introduced to a relatively general purpose UE device such as that illustrated in FIG. 2. Such a computer program product could be in the form of a physical storage medium, storing computer program instructions which could then be loaded onto the UE 40. In addition, the computer program product could contain a complete set of computer program instructions to implement one of the embodiments, or could include only those instructions required to augment existing software products, which it can be assumed are already loaded onto the UE 40.

It will also be appreciated that, in some circumstances, it will not be practical for a computer program product in the form of his physical storage medium, to be loaded directly into a UE 40. In particular, devices to read physical storage media may be too large to be included in a UE 40. Thus, it may be necessary to physically connect the UE 40 to a general purpose computer which could then received physical storage medium and transfer the computer program product loaded thereon, onto the UE 40.

Furthermore, rather than supplying a computer program product on a physical storage medium, embodiments could also be provided by a computer program product delivered by means of a download. Such a download could be provided directly to the UE 40, by way of a wireless connection, either to a macrocell network, or to a more local wireless network, such as one implemented using Wi-Fi. Again, the computer program product may include all of the software instructions required to implement an embodiment, or may include only those instructions required to in-house, augment or supplement existing computer program products already loaded onto the UE 40.

The UE 40 illustrated in FIG. 2 comprises a circuit board 50, a battery 52, a display 54, a keypad 56, a speaker 58 and a microphone 60. An antenna 62 extends from the UE, to provide radio connection with other equipment. A connector 70 is also provided, to enable direct physical electrical connection to other equipment, as may be required from time to time, such as for interconnection with another computer, for instance for the use described above.

The circuit board 50 of the UE 40 is illustrated in further detail in FIG. 3. The circuit board comprises a processor 100 which is configured to perform all of the processing activities normally associated with a UE. To do this, it is connected to a read only memory 102, which stores, permanently, processor executable instructions, and data, consistent with this role. Further, a read/write memory 104 provides a facility for the processor two store further instructions, and data, for use as required. A SIM socket 106 provides a receptacle for receiving a subscriber identity module (SIM).

An audio codec (coder/decoder) 108 provides facilities for interaction between the processor 100 and the previously described speaker 58 and microphone 60. The processor 100 itself is able to receive commands from the keypad 56 and to send display data to the display 54. It will be appreciated that, in some arrangements, it may be desirable to provide a separate display driver, and indeed drivers for the other components. For reasons of clarity, such drivers are not described in this embodiment.

An RF transmitter/receiver 10 provides facilities for interaction between the processor and the antenna 62.

In addition, a power management unit 112 provide power management facilities to the circuit board 50. These facilities might include power saving, early warning of battery discharge, surge protection, regulation and so on. For reasons of clarity, interconnections between the power management unit 112 and other components of the circuit board 50 are omitted from FIG. 3.

By execution of appropriate computer program products stored in either the read-only memory 102 or the read/write memory 104, the processor 100 establishes operation of a protocol stack 200 for communication with a base station. This base station may be the macrocell BS 20 or the picocell BS 30, as illustrated in FIG. 1.

As shown in FIG. 4, the protocol stack 200 comprises a plurality of services which can be organised conceptually into a number of layers. The reader, familiar with the field of this disclosure, will appreciate that the use of this layered concept does not necessarily reflect the way in which software products may be designed, in order to deliver the facilities required of the UE 40. However, the representation is useful in order to gain a better understanding of the embodiments set forth.

The physical layer services 202 as illustrated really represent the radio connectivity of the UE 40 with other devices. As such, much of the functionality of this layer will be provided by the RF transmitter/receiver 110. Having said that, some of the function of the RF transmitter/receiver 110 may be provided by software. One example of this is the general class of technologies known as "software defined radio". This enables the UE 40 to be made adaptable to changing radio protocols from time to time.

Data link services 204 provide the usual functionality of the data link layer found in most conceptual protocol stack representations.

Network services 206 provide the means for data connections to be established between the UE 50 and another device, with regard to issues such as quality of service. It is therefore responsible for handover from one cell to another in a cellular system. To that end, the network services 206 also provide radio resource control (RRC) services 208, which can be used to establish RRC protocols for use in managing handover. It will be appreciated by the reader that the RRC services layer 208 also provides other facilities, such as broadcast of system information, paging, management of radio connections, establishment of user bearers and management of Quality of Service (QoS), and security.

Finally, a layer of host services 210 is illustrated, representing all layers arising above the network services layer in a protocol stack, such as an operating system, applications, session control and so on.

RRC Layer of UE

FIG. 5 illustrates the radio resource control services block 208 referred to in connection with FIG. 4. This shows some of the facilities which are required in order to provide an implementation of one of the embodiments described below.

A radio message handler 302 attends to reception and transmission of RRC messages (including the measurement configuration), including handling/setting of the fields contained in the message. A measurement controller 304 is shown, which controls the execution of the measurements, stores the measurement configuration and measurement results (for example which cells have triggered an event) and handles the input provided by the measurement result handling.

A measurement result handler 306 performs some pre-processing of the measurement samples provided by the actual measurement unit for example filtering, analysis of event conditions. A measurement unit 308 performs measurements based on the input from measurement control. The measurement samples are provided to the measurement result handler 306.

A UE memory block 310 is shown, which is a memory resource allocated on the UE 40 for use by the RRC layer 208. It can be implemented in any appropriate memory resource, most likely the Read/Write memory 104.

The structure, architecture and function of base stations within this disclosure reflect the above description of a UE 40, and will not be described in detail here.

Handover

In cellular communication, handover of a UE from one cell to another is a well established technique. The aim, in handover, is to maintain connection with the UE so that sessions being run on the communication channel between the UE and another party are uninterrupted, and meet other specifications such as quality of service.

One approach, known in the art, is illustrated in FIG. 5. This is a schematic representation of a handover procedure carried out between a UE and a network of base stations. It is an element of this approach that the base stations are themselves networked to each other, so that the UE does not experience communications drop-out. Communication between the base stations may be by way of further wireless communications links or by physical connection.

One collection of standardised technologies representative of this illustrated approach is the E-UTRA technologies specified in the 3GPP standard specifications. In that context, the base station network can be considered exemplified by the E-UTRAN entity specified in the 3GPP specifications.

The handover procedure, as illustrated in FIG. 6, includes the configuration of measurement reporting as well as the actual measurement report. To this end, it involves the following main elements:

1. Reconfiguration Command

The base station network configures the UE to perform measurement reporting. The base station network does this using a reconfiguration procedure. In one approach, this is achieved by sending a message in the RRC protocol layer. This message is, for the purpose of this disclosure, known as the RRCConnectionReconfiguration message. To trigger the UE to commence a measurement procedure, a measurement configuration (measConfig) field is included in the RRCConnectionReconfiguration message.

2. Transmission of a Measurement Report by the UE

If certain conditions are met, the UE sends a MeasurementReport message to the base station network that includes measurement results for the cell(s) in which the UE has serving connectivity, as well as of one or more neighbouring cells, either on the serving frequency or on another frequency.

3. Base Station Network Orders the UE to Connect to Another Cell (Handover)

Handover is ordered by a handover command, sent by the serving base station of the base station network. The handover command, in one embodiment, comprises a further message in the RRCConnectionReconfiguration format, including a field named here mobilityControlInfo. This includes information as to the cell to which the UE should connect. The UE responds to this by establishing connection with the indicated cell.

4. UE Reports Completion of Handover

The UE reports back to the base station network that handover has been completed, in a handover completion message. This is illustrated for consistency with the existing aforementioned Standard, as RRCConnectionReconfigurationComplete, in FIG. 6.

measConfig Field

The measConfig field enables the base station network to specify the measurements to be conducted by the UE. The UE need not know the purpose to which the measurements will be put, at the base station network. It is entirely the responsibility, in this embodiment, of the base station network to determine the measurements to be used, and for what purpose they will be used. In one arrangement, the measConfig field includes a list of measurements, each comprising three elements. An example measConfig field is illustrated in FIG. 7.

1. Measurement Identity

The measurement identity 400-1, 400-2, 400-3, 400-4 identifies a measurement, linking a measurement object and a reporting configuration. Each of the blocks illustrated in FIG. 6 provide relationship information between one particular measurement object and one particular reporting configuration. As shown, a measurement is identified by an measurement identity, and is defined by one object and one reporting configuration.

2. Measurement Object

A measurement object 410-1, 410-2, 410-3 is a data item which specifies a set of cells of a certain radio access technology (RAT) type (for example, all cells on an LTE frequency, a list of cells on a UMTS frequency, a list of GSM cells/frequencies). The measurement object may also include a list of cells for which for configuration parameters are set to a specific value. In LTE there is only one cell specific measurement configuration parameter, namely the cell specific offset.

3. Measurement Reporting Configuration

The measurement reporting configuration specifies the basis on which the UE should trigger a measurement report as well as which information the UE should include in the measurement report.

In one approach, exemplified by reporting configuration 1 (420-1) in FIG. 6, a measurement reporting configuration is event triggered. In this case, a measurement report is triggered when a particular 'event condition' is fulfilled. An example of an event condition which could be used, is where a neighbour cell is found to be "better" than the cell currently serving the UE. This is denoted by "event a3" in FIG. 6. This might be determined by monitoring a particular criterion for an offset to exist between the performance criterion of the neighbouring cell against the current cell. An offset might be used to encourage or discourage mobility to a particular cell or frequency.

As represented by reporting configuration 2 (420-2) in FIG. 6, a measurement report could also be triggered at regular intervals. This reporting configuration might specify the period of the reporting cycle, and perhaps the number of times the reporting should be repeated.

The reporting configuration also specifies which measurement quantities should be reported, and the maximum number of cells that may be included in the report. The reader will appreciate that, in the event that the number of cells to be included in the report is to be limited, it is desirable to order the cells to be reported in an order of measurement result, that is with the best cell reported first.

In the E-UTRA context, measurements using event type a3 (Neighbour becomes offset better than PCell) are typically used by E-UTRAN to trigger handover to a neighbouring cell. Therefore, if a measurement of event type a3 is configured, the UE triggers the sending of a measurement report when a neighbouring cell meets the entering condition for at least a duration indicated by field timeToTrigger.

The entering condition is specified by:

$$Mn+Ofn+Ocn-Hys>Mp+Ofp+Ocp+Off \quad (1)$$

where:

Mn is the measurement result of the neighbouring cell, not taking into account any offsets;

Ofn is the frequency specific offset of the frequency of the neighbour cell (i.e. offsetFreq as defined within measObjectEUTRA corresponding to the frequency of the neighbour cell);

Ocn is the cell specific offset of the neighbour cell (i.e. cellIndividualOffset as defined within measObjectEUTRA corresponding to the frequency of the neighbour cell), and set to zero if not configured for the neighbour cell;

Mp is the measurement result of the PCell, not taking into account any offsets;

Ofp is the frequency specific offset of the primary frequency (i.e. offsetFreq as defined within measObjectEUTRA corresponding to the primary frequency);

Ocp is the cell specific offset of the PCell (i.e. cellIndividualOffset as defined within measObjectEUTRA corresponding to the primary frequency), and is set to zero if not configured for the PCell;

Hys is the hysteresis parameter for this event (i.e. hysteresis as defined within reportConfigEUTRA for this event); and Off being the offset parameter for this event (i.e. a3-Offset as defined within reportConfigEUTRA for this event).

In summary, for the support of mobility in a HetNet type of deployment the following measurement related configuration parameters are most relevant:

Time to trigger (TTT, timeToTrigger);

Offsets (frequency and cell-specific offsets, both of serving and neighbouring, as well as the event specific offset); and Hysteresis (Hys)

Mobility State and Speed Dependent Scaling

In the state known as RRC_Connected in LTE, and with equivalents in other known technologies, speed dependent scaling is applied to the timeToTrigger parameter. Speed dependent scaling involves multiplying the configured value by a scaling factor that depends on a UE speed state. Three mobility states are defined in LTE: normal (low), medium and high. For medium and high mobility states, separate scaling factors can be configured (0.25, 0.50, 0.75 or 1).

The UE speed state is determined based on the number of cell changes (handovers) in a particular period, as follows:

If the number of cell changes during a configurable period (t-Evaluation) exceeds a configurable high threshold (n-CellChangeHigh), the UE moves to the high mobility state else if the number of cell changes during a configurable period (t-Evaluation) exceeds a configurable medium threshold (n-CellChangeMedium), the UE moves to the medium mobility state else if during a configurable period (t-HystNormal) the above conditions for entering high or medium state are not met, the UE moves to the normal mobility state.

The reader should note that the above conditions impose hysteresis to the transition back to the normal mobility state.

One issue which is identified in the above arrangement is that it is not possible to address all HetNet mobility scenarios with existing configuration parameters. In essence, this problem is exemplified in that, in a radio network employing both macrocell and picocells on one frequency, it is not possible to configure the UE to report measurements in a manner that is optimal for all types of cell changes. In particular, handover related measurement reports should be triggered relatively quickly in case of mobility to and/or from a picocell whereas handovers between macrocells may be more appropriately triggered somewhat more slowly.

In this respect it should be noted that applying a lower value for the timeToTrigger parameter will ensure that the UE reports more quickly the identification of a neighbouring cell that is somewhat better than the existing serving cell. However, if the UE is stationary on the border of two cells, assigning a lower value to timeToTrigger may result in more frequent switches between the two cells (i.e. ping-pong). Other potential approaches to providing amelioration of this issue of heterogeneity may suffer from tradeoffs similar to this one.

Examples set out below focus on the case that macrocell and picocells are deployed on one layer. It will be appreciated that it is already possible to configure different parameters for different frequencies. Some of the examples may also offer advantages, in certain circumstances, for inter-frequency mobility when each frequency has different types of cells (i.e. only macrocell or pico).

A number of embodiments will now be described. While the embodiments are described in the context of the above description of techniques specific to a particular class of radio communication technologies, and to a particular model for considering the organisation of processes into a protocol stack, the reader will understand that the disclosure is not limited thereto.

Embodiment 1

In this embodiment, speed dependent scaling is applied to parameters affecting the triggering of the relevant event triggered measurement reports, other than timeToTrigger. In particular, the embodiment comprises expediting handover by reducing one or more offset parameters used in the entry condition of the event used to trigger the handover.

For these parameters, speed dependent scaling is applied, in a manner similar to that currently used for timeToTrigger. That is, in the medium and high mobility states, the UE multiplies the parameter with a configurable scaling factor.

In a particular example of this, the event specific offset parameter Off is scaled by the mobility state. To do this, in one example, information is borne in the reportConfig message to instruct the UE on how to scale the event specific offset with respect to the mobility state.

In a yet more particular example, in addition to applying speed dependent scaling to the event specific offset parameter Off, the same technique is also applied to the frequency and cell specific offsets (Ofn, Ofp; Ocn, Ocp).

In a particular example, the mobility state determined for the UE is applied universally for consideration of speed dependent scaling. That is, in the operation of this specific example there is only one mobility state and this is used for scaling all scalable parameters. In one approach, different scaling factors are applied (and configured) for each parameter, but the alternative, where a single set of parameter scaling factors are used for all scalable parameters, is not discounted.

While it is mentioned above that the speed dependent scaling factors can be specified in the RRCConnectionReconfiguration message, more specifically an example of this embodiment can implement specification of the speed dependent scaling factors in the measurement configuration as it applies for all measurements using the concerned parameters, as done for the scaling factor for timeToTrigger. That is, the speed scaling factors are specified at the same location as used for the scaling factors for parameter timeToTrigger.

Embodiment 2

In this embodiment, an arrangement is described which implements different approaches to handover, depending on the type of handover presented.

It is desirable, in a HetNet type of deployment, to expedite handovers to picocells without affecting handovers between macrocells.

To achieve this, this embodiment provides a UE with a set of parameters per type of handover. This enables the UE to determine if handover is to be entered, depending on the type of handover being assessed.

The following types of handovers can be specified, if two classes of cells can be identified:
1) pico->macro
2) macro->pico
3) pico->pico
4) macro->macro In one approach, under this embodiment, it could be conceived that a UE would determine the nature of the source and/or target cell, and apply parameters relating to which of the possible types of handover applies.

It will be appreciated that it may be difficult for a UE to read system information from each possible target cell, to enable it to determine the nature of that cell. It may also not be appropriate or technically practicable for the base station network to broadcast, for the possible use of each UE, the nature of each cell in the vicinity of the UE.

As a result, an example of this embodiment involves the base station network supplying the UE with a range of physical cell identities (PCIs) that the UE should assume to be used by picocells only. In a particular implementation of this, where a further type of cell is identified, such as nanocells, the PCIs of these cells could also be provided to the UE.

The UE will then assume that any cell not denoted by a PCI on the list provided thereto is a macrocell. From this, it will be able to determine the type of transition being represented by the identity of the current cell and the identity of the neighbour cell to which handover is contemplated.

An implementation of this embodiment can provide separate sets of parameter values for all parameters affecting the measurement reporting i.e. timeToTrigger, offsets (frequency, cell and event specific), thresholds, hysteresis and scaling factors. It may however be simpler to define separate sets only for a subset of the parameters, for example the parameters affecting handover performance to the greatest extent.

In a particular implementation, it may be sufficient to impose a requirement that, for handover from one macrocell to another macrocell, handover should be relatively slow (i.e. a relatively long timeToTrigger should be applied) while for all other handover cases (picocell to macrocell, macrocell to picocell, picocell to picocell) handover should be relatively quick. In one alternative arrangement of this embodiment, therefore, two sets of parameters are defined, one set for mobility reports that should be triggered slowly and one set of parameters for mobility reports that should be triggered relatively quickly. In this case, the UE applies the first set (slow) for measurement reporting involving macrocells only and the second set (quick) for all other cases.

In a particular arrangement of this embodiment, the additional parameter sets are specified at the location where the corresponding parameters are currently defined. Additional offsets are included in the reportConfig. PCI ranges are also included within measObject.

One particular feature, which can be incorporated into this embodiment, is to apply scaling for any parameter for which speed dependent scaling is defined, in accordance with the principles laid out in the description of embodiment 1. This can be carried across all sets of parameters, per transition type. Thus, it is not necessary to restate speed dependent parameter scaling in every set, if it is intended to apply speed dependent scaling for a parameter. The UE will infer from the provision of speed dependent scaling in one parameter set that it is to be applied for all transition types.

Embodiment 3

A general characteristic of the radio signals in HetNet types of deployment is that at some cell borders the differences in the measurement of the source compared to that of the candidate cell changes rapidly (such as to and from a picocell), while at other cell borders the changes occur much more slowly (such as between two macrocells).

This embodiment employs this effect by apply different sets of parameters for handover entering conditions, depending on the rate of change of the relevant measurement results.

In general terms, therefore, this embodiment concerns a UE which applies different sets of measurement triggering related parameters for different levels of the gradient of the measurement result. That is, if the measurement result changes more than a certain amount in a particular measurement period, this is denoted "level 1" gradient. The UE then applies the set of parameters defined for this level. Two or more sets of parameters, each representing a certain 'gradient level', may be defined.

As above discussed in relation to embodiment 2, an implementation of this embodiment can provide separate sets of parameter values, per gradient level, for all parameters affecting the measurement reporting i.e. timeToTrigger, offsets (frequency, cell and event specific), thresholds, hysteresis and scaling factors. It may however be simpler to define separate sets only for a subset of the parameters, for example the parameters affecting handover performance to the greatest extent.

In a particular arrangement of this embodiment, the parameter sets, per gradient level, are specified at the location where the parameters are defined. Additional offsets are included in the reportConfig.

Again, as referred to with reference to embodiment 2, scaling can be applied for any parameter for which speed dependent scaling is defined, in accordance with the principles laid out in the description of embodiment 1. This can be carried across all sets of parameters, per gradient level. Thus, it is not necessary to restate speed dependent parameter scaling in every set, if it is intended to apply speed dependent scaling for a parameter. The UE will infer from the provision of speed dependent scaling in one parameter set that it is to be applied for all transition types.

Some events are based on the serving cell only, while others are based on comparison of a serving and a neighbouring cell. The gradient can be applied in either or both cases. For events based on a single cell, the gradient level is based on the measurement result of the cell in question. For events based on the comparison of cells, for example a serving cell and a neighbouring cell, the gradient level is based on the difference in the measurement result of the two cells, for example the difference between the serving and the neighbouring cell.

Measurement results are based on physical layer samples that may be taken at an implementation specific rate. To achieve a defined measurement performance, these measurements are filtered both at the physical layer (layer 1) as well as by the radio resource control layer (layer 3). To achieve a defined performance, the gradient either has to be based on the filtered measurements or, when the gradient is based on the unfiltered measurements, separate filtering has to be applied to the measurement gradient.

Which level corresponds with a measurement gradient value can either be universally agreed (i.e. specified in technical standards) or be configured by the particular implementation of the base station network. If configuration is used, the base station network would for example indicate that level 1 would apply for values up to Va, level 2 would apply for values up to Vb, etc. As this part of the configuration (i.e. these boundary values) can be shared between measurements using gradient levels, it is appropriate to signal this as part of the measObject or the measConfig.

Embodiment 4

Whereas embodiment 3 considers defining different sets of parameters for different levels of gradients, embodiment 4 implements inclusion of the gradient in the entry and leave condition specified for event triggered measurements. This may be done both for measurements involving only the serving cell, and for those involving the serving and a neighbouring cell.

For the example of event a3 noted above, the entry condition is specified to be the following:

$$Mn+Ofn+Ocn-Hys>Mp+Ofp+Ocp+Off \quad (1)$$

This embodiment implements introduction of the gradient in equation (1) by replacement of the parameters Mn and Mp by modified parameters, Mn* and Mp*, defined as follows:

$$Mn^*=Mn+an^*Mn \quad (2)$$

$$Mp^*=Mn+ap^*Mp \quad (3)$$

In this embodiment, the gradient multiplication factors an, ap are configured as is the case for other similar measurement parameters. As such they can be carried in ReportConfig.

As for embodiment 3, measurement results are based on physical layer samples that may be taken at an implementation specific rate. To achieve a defined measurement performance, these measurements are filtered both at the physical layer (layer 1) as well as by the radio resource control layer (layer 3). To achieve a defined performance, the gradient either has to be based on the filtered measurements or, when the gradient is based on the unfiltered measurements, separate filtering has to be applied to the measurement gradient.

Moreover, as for embodiment 3, measurement gradient multiplication factors can be selected on the basis of levels of gradient. That is, the base station network could for example indicate that level 1 (and thus a first measurement gradient multiplication factor) would apply for values up to Va, level 2 (and thus a second gradient multiplication factor) would apply for values up to Vb, etc. As this part of the configuration (i.e. these boundary values) can be shared between measurements using gradient levels, it is appropriate to signal this as part of the measObject or the measConfig.

Like other similar configuration parameters, measurement gradient multiplication factors are in this embodiment included in the reportConfig command.

Embodiment 5

Embodiment 5, in general terms, applies speed dependent scaling in a manner dependent on the type of mobility related measurement scenario (i.e. picocell to macrocell, macrocell to picocell etc.). This seeks to improve measurement performance in HetNet deployments, by applying scaled down parameters at the UE if the handover scenario allows.

More particularly, in this embodiment, 'no scaling' as well as 'scaling for medium speed state' are used only when both the serving cell and the neighbour cell are macrocells. In other words, whenever at least one of the UE serving cell and the candidate neighbouring cell is a picocell, the UE applies the speed scaling factors defined for high mobility state.

Rather than a fixed rule of this type, in an alternative arrangement of this embodiment the base station network configures the minimum scaling factor to apply for each cell change type. This configuration can be re-used by several measurements and hence it can appropriately be signalled as part of the measObject or the measConfig.

As per embodiment 2, it may not be convenient, in all circumstances, to expect the UE to read system information to determine the type of cell it is considering. Thus, the base station network can, in one arrangement of this embodiment, supply the UE with a range of physical cell identities (PCIs) that the UE should assume to be used by picocells only. In a particular implementation of this, where a further type of cell is identified, such as nanocells, the PCIs of these cells could also be provided to the UE.

The UE will then assume that any cell not denoted by a PCI on the list provided thereto is a macrocell. From this, it will be able to determine the type of transition being represented by the identity of the current cell and the identity of the neighbour cell to which handover is contemplated.

Embodiment 6

Whereas previously described embodiments use measurement gradient as a refinement of mobility state, this embodiment uses measurement gradient as a precursor to the response of a UE to its mobility state.

That is, the behaviour of a UE, in a particular mobility state, depends on the measurement gradient.

More particularly, if the measurement gradient level is 'normal', the UE applies speed scaling normally i.e. depending on UE speed state.

If the measurement gradient level is 'medium', the UE applies the scaling factor for medium or high speed states, depending on the mobility state. That is, the UE applies the scaling factor for a medium speed state if the UE speed state is normal or medium and applies the scaling factor for high speed if the UE speed state is high.

If the measurement gradient is 'high' the UE applies the scaling factor for high speed state regardless of the UE speed state. Table 1 sets this out in summary.

TABLE 1

| Measurement gradient | UE Mobility State | | |
|---|---|---|---|
| | Normal | Medium | High |
| Normal | Apply normal speed scaling | Apply medium speed scaling | Apply high speed scaling |
| Medium | Apply speed scaling for medium speed state | Apply speed scaling for medium speed state | Apply speed scaling for high speed state |
| High | Apply speed scaling for high speed state | Apply speed scaling for high speed state | Apply speed scaling for high speed state |

In short, therefore, when selecting the scaling factors, the UE applies the maximum of the speed state and the measurement gradient level. For example, it applies 'high' whenever either the UE speed state or the measurement gradient level is determined to be high.

Rather than a fixed rule as set out above and with reference to table 1, the base station network could also specify a minimum scaling factor to apply for each measurement gradient level. This configuration can be re-used by several measurements and hence it could be signalled as part of the measObject or the measConfig.

As per embodiment 3, some events are based on the serving cell only, while others are based on comparison of a serving and a neighbouring cell. The measurement gradient can be applied in either or both cases. For events based on a single cell, the gradient level is based on the measurement result of the cell in question. For events based on the comparison of cells, for example a serving cell and a neighbouring cell, the gradient level is based on the difference in the measurement result of the two cells, for example the difference between the serving and the neighbouring cell.

Measurement results are based on physical layer samples that may be taken at an implementation specific rate. To achieve a defined measurement performance, these measurements are filtered both at the physical layer (layer 1) as well as by the radio resource control layer (layer 3). To achieve a defined performance, the gradient either has to be based on the filtered measurements or, when the gradient is based on the unfiltered measurements, separate filtering has to be applied to the measurement gradient.

Which level corresponds with a measurement gradient value can either be universally agreed (i.e. specified in technical standards) or be configured by the particular implementation of the base station network. If configuration is used, the base station network would for example indicate that level 1 would apply for values up to Va, level 2 would apply for values up to Vb, etc. As this part of the configuration (i.e. these boundary values) can be shared between measurements using gradient levels, it is appropriate to signal this as part of the measObject or the measConfig.

Embodiment 7

Embodiment 7, in general terms, differs from previously presented arrangements by the introduction of an additional scaling factor, based on the gradient, applied to the parameters described above.

In this embodiment, the scaling factor applied by the UE is the product of the speed dependent scaling factor and the measurement gradient scaling factor. To some extent, this is similar to UE speed state dependent scaling, but where the UE applies an additional scaling factor based on the measurement gradient. The parameter that the UE applies (Pa) is the result of multiplying the speed dependent scaling factor (SFs), the measurement gradient scaling factor (SFg) and the originally base-line parameter (Pb) i.e.:

$$Pa=SFs*SFg*Pb \qquad (4)$$

As per embodiment 3, some events are based on the serving cell only, while others are based on comparison of a serving and a neighbouring cell. The measurement gradient can be applied in either or both cases. For events based on a single cell, the gradient level is based on the measurement result of the cell in question. For events based on the comparison of cells, for example a serving cell and a neighbouring cell, the gradient level is based on the difference in the measurement result of the two cells, for example the difference between the serving and the neighbouring cell.

Measurement results are based on physical layer samples that may be taken at an implementation specific rate. To achieve a defined measurement performance, these measurements are filtered both at the physical layer (layer 1) as well as by the radio resource control layer (layer 3). To achieve a defined performance, the gradient either has to be based on the filtered measurements or, when the gradient is based on the unfiltered measurements, separate filtering has to be applied to the measurement gradient.

Which level corresponds with a measurement gradient value can either be universally agreed (i.e. specified in technical standards) or be configured by the particular implementation of the base station network. If configuration is used, the base station network would for example indicate that level 1 would apply for values up to Va, level 2 would apply for values up to Vb, etc. As this part of the configuration (i.e. these boundary values) can be shared between measurements using gradient levels, it is appropriate to signal this as part of the measObject or the measConfig.

The speed dependent scaling factors can be specified in the measurement configuration, as this applies for all measurements using the concerned parameters, as done for the scaling factor for timeToTrigger.

Embodiment 8

In this embodiment, an additional scaling factor is introduced, based on the mobility scenario applied to the same parameters. This has substantial similarities to embodiment 7, but in this case the additional scaling factor is based on the mobility scenario rather than on the gradient level.

In detail, the UE according to this embodiment applies an additional scaling based on the mobility scenario (picocell to macrocell, macrocell to picocell, picocell to picocell and macrocell to macrocell). The parameter that the UE applies in the end (Pa) is the result of multiplying the speed dependent scaling factor (SFs), the mobility scenario scaling factor (SFm) and the originally base-line parameter (Pb) i.e.

$$Pa = SFs * SFm * Pb \quad (5)$$

Naturally, earlier discussion about supplying details, from the base station network, to the UE, of the identities of picocells in the network, apply also here. This will enable cell type indication to be used for enhanced mobility state detection.

As indicated in previous embodiments, it may be sufficient to distinguish two mobility scenarios (i.e. one corresponding with 'quick' and one with 'slow').

The additional scaling factor used in this embodiment, to denote mobility scenario dependent scaling, can be supplied in the measConfig data item.

Embodiment 9

In this embodiment, the base station network takes into account measurement gradient when making handover decisions. In one arrangement of this embodiment, the base station network configures the UE to start periodic reporting after an event has been triggered.

The triggering of the event may reflect a condition that may be best described as 'the time is almost right to initiate a handover'. In such a case periodic reporting may be used by the network to validate that the conditions for performing handover are indeed right. For such a case, inclusion of the measurement gradient information in the measurement report from the UE can be useful.

Thus, in general terms, this embodiment can be characterised as the base station network configuring the UE to include measurement gradient information when reporting measurements. The UE reports the measurement gradient of the cells for which measurement results are included in the report. Thus, this could concern both serving and neighbouring cells.

Further detailed examples of this embodiment concern how the base station network signals this configuration to the UE. In particular, the base station network configures the UE to perform measurement gradient reporting within the measurement configuration measConfig.

As will be understood by the reader, some of the preceding discussion as to the nature of, and handling of, the measurement gradient, also apply to this embodiment. In particular, some events are based on the serving cell only, while others are based on comparison of a serving and a neighbouring cell. The gradient can be applied in either or both cases. For events based on a single cell, the gradient level is based on the measurement result of the cell in question. For events based on the comparison of cells, for example a serving cell and a neighbouring cell, the gradient level is based on the difference in the measurement result of the two cells, for example the difference between the serving and the neighbouring cell.

Measurement results are based on physical layer samples that may be taken at an implementation specific rate. To achieve a defined measurement performance, these measurements are filtered both at the physical layer (layer 1) as well as by the radio resource control layer (layer 3). To achieve a defined performance, the gradient either has to be based on the filtered measurements or, when the gradient is based on the unfiltered measurements, separate filtering has to be applied to the measurement gradient.

Which level corresponds with a measurement gradient value can either be universally agreed (i.e. specified in technical standards) or be configured by the particular implementation of the base station network. If configuration is used, the base station network would for example indicate that level 1 would apply for values up to Va, level 2 would apply for values up to Vb, etc. As this part of the configuration (i.e. these boundary values) can be shared between measurements using gradient levels, it is appropriate to signal this as part of the measObject or the measConfig.

Embodiment 10

The reader will appreciate that the above embodiments are not mutually exclusive. It is entirely possible to envisage, from the above, the combination of the features of any of the above embodiments.

In particular, for example, the measurement gradient can be introduced into the entering and leaving conditions for event a3 while at the same time also introducing measurement gradient dependent scaling for timeToTrigger and cell type specific UE speed state detection.

Flow Diagram and Message Changes

In the particular context of Evolved Universal Terrestrial Radio Access, as specified by the LTE series of standards, but particularly with reference to 3GPP TS 36 331, it is necessary to envisage a change to existing standard techniques in order to provide implementation of one of the described embodiments.

The reader will see that the "base station network" referred to above can be implemented by a modified version of the E-UTRAN entity defined in the existing versions of the above standard. Similarly the UE as described herein can be implemented by a UE as specified in the standards, with appropriate extensions and modifications as expressed above.

Most of the proposals included in the previous sections involve an extension of the measurement configuration that E-UTRAN provides to the UE. This affects the RRCConnectionReconfiguration message, in particular the field measConfiguration and/or its subfields. Table 2 sets out to show how the embodiments can be implemented, in the context of extending the existing accepted standard implementations of Radio Resource Control.

TABLE 2

| Embodiment | Additional configuration | Location | Notes |
|---|---|---|---|
| 1 | Scaling factors for additional parameters for example offset | measConfig | |

TABLE 2-continued

| Embodiment | Additional configuration | Location | Notes |
|---|---|---|---|
| 2 | Measurement parameters for specific cell change types | Same location as where the parameter is currently specified i.e. mostly within reportConfig | Existing parameters can be used for macrocell to macrocell changes |
| 2 | PCI range of picocells | measObject | Applicable for the concerned frequency |
| 3 | Measurement parameters for different levels of measurement gradient | Same location as where the parameter is currently specified i.e. mostly within reportConfig | Existing parameters can be used for slow/ macrocell to macrocell changes (Same as for 2) |
| 3 | Measurement gradient levels | measObject or measConfig | Same for all measurements on the frequency |
| 4 | Measurement gradient factors (serving and/or neighbouring) | reportConfig | |
| 5 | PCI range of picocells, see 2 | measObject | Applicable for the concerned frequency |
| 5 | E-UTRAN could configure the minimum scaling factor to apply for each cell change type | measObject or measConfig | Same for all measurements on the frequency |
| 6 | Measurement gradient levels, see 3 | measObject or measConfig | |
| 6 | E-UTRAN could configure the minimum scaling factor to apply for each measurement gradient level | measObject or measConfig | Same for all measurements on the frequency |
| 7 | Measurement gradient levels, see 3 | measObject or measConfig | |
| 7 | Additional scaling factors (based on measurement gradient level) | measConfig | Currently scaling factors are specified in measConfig |
| 8 | PCI range of picocells, see 2 | measObject | Applicable for the concerned frequency |
| 8 | Additional scaling factors (based on mobility scenario) | measConfig | Currently scaling factors are specified in measConfig |
| 9 | Measurement gradient report request | reportConfig | Probably only relevant for some of the measurements |

Only one of the above embodiments also affects the contents of the MeasurementReport message that the UE sends to E-UTRAN, as set out in table 3:

TABLE 3

| Embodiment | Additional configuration | Location | Notes |
|---|---|---|---|
| 9 | Measurement gradient information | MeasurementReport (measResultServCell and MeasResultEUTRA within measResultNeighCells) | For all cells for which measurement results are provided |

As will be appreciated by the reader, implementation of an embodiment such as related above will impact on the design of the measurement related blocks of the RRC layer 208 of the UE 40. For instance:

The radio message handler 302 has to support the described measurement configuration extensions and include the required information in the measurement report;

The measurement controller 304 has to support the described measurement options, some of which are based on the described configuration options;

The measurement result handler 306 has to process the samples in a manner commensurate with the above detailed description of the embodiments, for example in compiling the gradient and in the analysis of further conditions.

It is not expected that any requirements are imposed on the measurement unit 308 by the embodiments described herein, but the present disclosure does not preclude modifications thereto if appropriate in certain circumstances.

Implementation Details

To provide the reader with a further understanding of a manner in which the presently described embodiments can be put into practice, the following comprises a description of features, some of which are common to certain pluralities of the above embodiments. Whereas the following technical features are presented using the nomenclature used in the LTE series of standards, which will no doubt be familiar to the reader, this is not to be taken as an implicit limitation of the disclosure to that particular radio technology.

Determination of the Mobility Scenario (Related to Embodiments 2, 5, 8 and 10)

The UE implemented in accordance with any one of the above referenced embodiments will need to determine the mobility scenario (picocell to macrocell, macrocell to picocell, picocell to picocell and macrocell to macrocell). This will arise, for example, when the UE needs to determine which, of the sets of measurement reporting parameters that are configured for the different mobility scenarios, applies, or when the UE is configured to select the scaling factor based on both the UE mobility state and the mobility scenario. In such a case, in the context of the LTE technology referenced above:

E-UTRAN indicates which physical cell identities (PCIs) are used by picocells within the measObject.

The UE considers cells that are neither within the range reserved for picocells, nor within the range reserved for femto cells (if the UE has this information that is indicated by field csg-PhysCellIdRange within SIB4, for the concerned frequency), to be macrocells.

Determination of Measurement Gradient Level (Related to Embodiments 3, 6, 7, 9 and 10)

In embodiments 3, 6, 7, 9 and possibly (depending on configuration) 10, the UE may be required to determine the measurement gradient level. This may arise when:

There is a need to determine which, of the sets of measurement reporting parameters that are configured for the different measurement gradient levels, applies;

The scaling factor must be selected based on both the UE mobility state and the measurement gradient level; or The specific scaling factor for a particular measurement gradient level must be determined.

In this case:

E-UTRAN indicates which upper value applies for each measurement gradient level, either within the reportConfig or within the measConfig The UE calculates the measurement gradient of a measurement result for a particular cell as follows:

the UE applies the (filtered) measurement results as used for evaluating if event triggering conditions are met the UE subtracts the previous result from the current result and divides the result by the time interval that elapsed between the previous and current measurement result became available Using Different Parameter Sets, in Particular Specifying the Parameter Sets, and Selecting Based on Mobility Scenario or Gradient Level (Related to Embodiments 2, 3 and 10)

A large number of parameters can affect measurement reporting. Some of these parameters are event specific, for example timeToTrigger, (event specific) offsets, thresholds and hysteresis. Other such parameters are common to all measurements (for example UE speed state parameters, scaling factors and quantityConfig) or common to all measurements on a frequency or cell (namely frequency and cell specific offsets).

timeToTrigger and offset could be the two most critical parameters when it comes to the timely triggering of a measurement report upon mobility to/from a picocell. If this is the case, it would be desirable to apply different values for these parameters depending on the mobility scenario, or depending on the measurement gradient level.

For example, one set of values could be used for cases where the measurement report should be triggered relatively quickly and another set for cases in which the triggering of the report should be somewhat slower. An example of two of such sets for these two parameters is provided in table 4 below.

TABLE 4

| Parameter | Set 1 (slow) | Set 2 (fast) |
| --- | --- | --- |
| timeToTrigger | 256 ms | 64 ms |
| offset | 6 | 0 |

When two or more parameter sets are defined, the UE:

handles measurement reporting parameters not included in these sets in the normal manner—for these there is only one value;

for the measurement reporting parameters included in these sets, the UE determines, either based on the mobility scenario or based on the measurement gradient level, which of the sets applies when evaluating measurements of a serving cell and/or of a serving and neighbouring cell pair Selection of Speed State Factor Based on Two Inputs (Related to Embodiments 5, 6 and 10)

For embodiments 5 and 6, with possible inclusion also in embodiment 10, the UE is configured to select the speed state factor based on both UE speed state and either mobility scenario or measurement gradient level, as the case may be.

In this case, the following applies:

E-UTRAN indicates the minimum scaling factor that applies for each cell change type/measurement gradient level either as part of the measObject or the measConfig. As noted above, it is possible that the minimum value may not be configurable by EUTRAN but is instead pre-set, such as by agreement in a technical standard;

The UE determines the set of parameters (Ss) that applies according to UE speed state (i.e. normal, medium, high);

The UE determines the minimum set (i.e. normal, medium, high) (Sm) applicable for either the cell change type or the measurement gradient level, depending on the embodiment. This either corresponds with the value configured by E-UTRAN or the standard-specified value;

The UE applies the set corresponding with the maximum of Ss and Sm for example if Ss=high and Sm=medium, the UE applies the set defined for 'high'.

Use of Additional/Multiple Scaling Factors (Related to Embodiments 7, 8 and 10)

In embodiments 7 and 8, and envisaged in certain configurations of embodiment 10, the UE selects the speed state factor based on both UE speed state and either mobility scenario or measurement gradient level. In this case, the following applies:

E-UTRAN indicates the scaling factors that apply for each measurement gradient level as part of the measConfig;

The UE determines the measurement gradient level (as set out in the description of the embodiments above);

The UE determines the scaling factor that applies for the concerned measurement gradient level i.e. as configured by E-UTRAN; and For each parameter that is scaled, the UE applies the following:

The value of the parameter that the UE applies (Pa) is the result of multiplying the speed dependent scaling factor (SFs), the measurement gradient scaling factor (SFg) and the original base-line parameter (Pb) i.e. $Pa=SFs*SFg*Pb$ While certain embodiments have been described, these embodiments have been presented by way of example only, and are not intended to limit the scope of the protection sought in this application. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A terminal in a communication system, the terminal comprising:

a transceiver configured to transmit and receive signals; and at least one processor configured to:

control the transceiver to receive a cell list associated with a predetermined cell type from a base station, identify, by the terminal, a type of handover based on the received cell list associated with the predetermined cell type, identify a configuration parameter among at least two configuration parameters based on the identified type of the handover, and trigger a measurement report using the identified configuration parameter.

2. The terminal of claim 1, wherein the at least one processor is further configured to receive the at least two configuration parameters from the base station.

3. The terminal of claim 1, wherein each configuration parameter includes a time to trigger (TTT).

4. The terminal of claim 1, wherein the received cell list includes at least one of a cell index or a physical cell identifier (PCI) range.

5. The terminal of claim 1, wherein the type of the handover includes one of a pico-macro handover, a macro-pico handover, a pico-pico handover, or macro-macro handover.

6. The terminal of claim 3, wherein each configuration parameter further includes at least one of an offset, a threshold, a hysteresis, or a scaling factor, for the measurement report.

7. The terminal of claim 1, wherein the at least one processor is further configured to control the transceiver to transmit the triggered measurement report to the base station.

8. A method by a terminal in a communication system, the method comprising:
   receiving, by the terminal, a cell list associated with a predetermined cell type from a base station;
   identifying, by the terminal, a type of handover based on the received cell list associated with the predetermined cell type;
   identifying a configuration parameter among at least two configuration parameters based on the identified type of the handover; and
   triggering a measurement report using the identified configuration parameter.

9. The method of claim 8, wherein the method further comprises receiving the at least two configuration parameters from the base station.

10. The method of claim 8, wherein each configuration parameter includes a time to trigger (TTT).

11. The method of claim 8, wherein the received cell list includes at least one of a cell index or a physical cell identifier (PCI) range.

12. The method of claim 8, wherein the type of the handover includes one of a pico-macro handover, a macro-pico handover, a pico-pico handover, or a macro-macro handover.

13. The method of claim 10, wherein each configuration parameter includes at least one of an offset, a threshold, a hysteresis, or a scaling factor, for the measurement report.

14. The method of claim 11, wherein the method further comprises transmitting the triggered measurement report to the base station.

* * * * *